United States Patent [19]

Balanky

[11] Patent Number: 4,531,560
[45] Date of Patent: Jul. 30, 1985

[54] PROTECTIVE COVER FOR VEHICLES

[76] Inventor: Michael F. Balanky, 8116 Ibach Rd., Jacksonville, Fla. 32216

[21] Appl. No.: 564,166

[22] Filed: Dec. 22, 1983

[51] Int. Cl.³ .............................................. B60J 11/00
[52] U.S. Cl. ............................... 150/52 K; 150/52 R; 296/136
[58] Field of Search ............. 150/52 R, 52 K; 296/98, 296/100, 136; 24/230.5, 231

[56] References Cited

U.S. PATENT DOCUMENTS

| | | | |
|---|---|---|---|
| 1,039,480 | 9/1912 | Bassett | 150/52 K |
| 1,530,540 | 3/1925 | Bouffier | 150/52 K |
| 1,584,518 | 5/1926 | Drake | 150/52 K |
| 2,119,072 | 5/1938 | Cohen | 150/52 K |
| 2,243,981 | 6/1941 | Rowan | 150/52 K |
| 2,595,833 | 5/1952 | Flaherty | 150/52 K |
| 2,623,481 | 12/1952 | Muciaccia et al. | 296/136 |
| 3,401,977 | 9/1968 | Schamel | 296/136 |
| 3,665,355 | 5/1972 | Sasaki et al. | 150/52 K |
| 4,036,521 | 7/1977 | Clenet | 296/100 |
| 4,041,999 | 8/1977 | Miller | 150/52 K |

FOREIGN PATENT DOCUMENTS 246268  1/1926  United Kingdom ............... 296/136

Primary Examiner—Joseph Man-Fu Moy
Assistant Examiner—David T. Fidei
Attorney, Agent, or Firm—Arthur G. Yeager

[57] ABSTRACT

A protective cover that can be easily placed on or removed from the front and sides of a vehicle to protect its finish, the cover comprising a hood cover member, a pair of front body covers, a pair of rear body covers, and means for removeably attaching each said cover to the corresponding portion of the outside of the vehicle, the attaching means being a plurality of spaced magnets around the perimeter of each cover and a plurality of manually bendable tab clasps around the perimeter of the cutout area of the cover corresponding to the wheel well of the vehicle and at other suitable locations around the perimeter of the cover.

12 Claims, 4 Drawing Figures

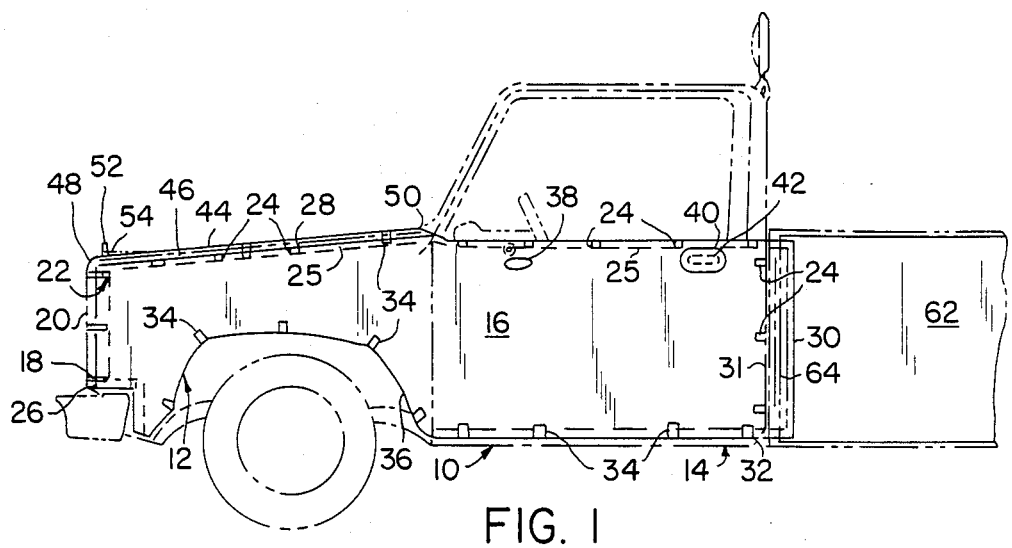
FIG. 1
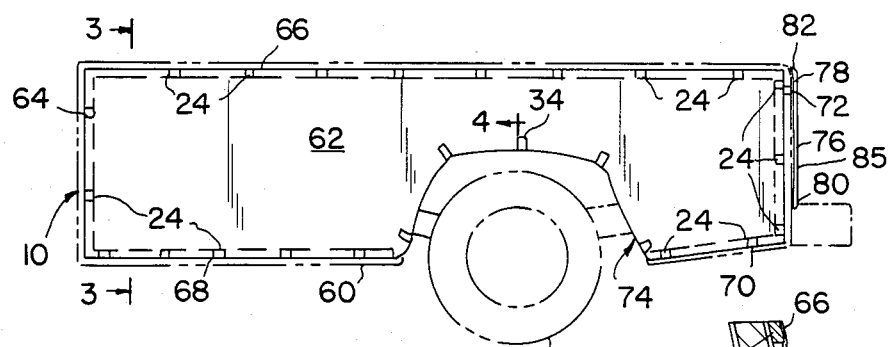
FIG. 2
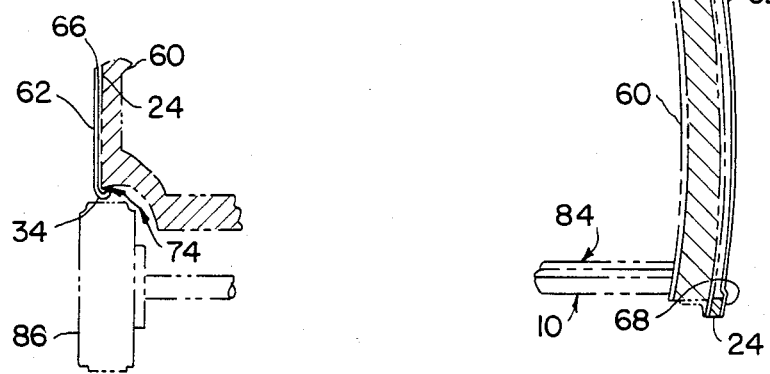
FIG. 4
FIG. 3

PROTECTIVE COVER FOR VEHICLES

BACKGROUND OF THE INVENTION

Many vehicles, particularly pickup trucks and vans, are operated in recreational activities, such as hunting, fishing, camping, and exploring, in areas that are uncleared or partially cleared of vegetation that is sufficiently hard or sharp to scratch and mar the high gloss finish on such vehicles and make their appearance undesirable for daily use. In pursuit of these recreational activities, these vehicles frequently push through areas having no roads and having dense growths of bushes and small trees. The high gloss enamel finish on most vehicles would be essentially destroyed by the scraping and scratching of the bushes and trees encountered in the first trail breaking endeavor. Accordingly, there is a great need for a cover which can protect against such destructive scraping and scratching.

One effort to solve this problem is found in U.S. Pat. No. 4,041,999 to Miller. This patent discloses a pickup truck with sheets of plastic material attached in several sections to the outside of the truck to cover all finished areas. The covers of this patent are attached to the vehicle mainly by snap fasteners and hooks. This requires a permanent disfigurement of the finish of the vehicle by the insertion of the stud portion of the snap fastener at a multitude of locations on the hood and body of the truck. Not only are such studs unsightly but they are dangerous in that they may catch the clothing of a person near the truck and cause damage to the clothing or injury to the person. Plastic hooks employed in this patented invention do not provide any flexibility or adjustment for attachment to panels and body portions that may be slightly larger or smaller than the standard design sizes. If the panel is slightly larger than expected, the cover cannot be attached at all, and if the panel is slightly smaller than expected the cover will be so loosely attached that it may be easily torn off by the vegetation, leaving no protection for the finish of that panel. Furthermore, this system of covers employs bands across the hood to help hold the front fender covers in place, and this prevents ready access to the engine because the bands prevent the hood from being opened. It is clearly important to provide an improved cover system for such vehicles.

It is an object of this invention to provide an improved system of covers for the finished areas of vehicles operating off the road. It is another object of this invention to provide an improved fastening means for removeably attaching covers to off-the-road vehicles. It is still another object of this invention to provide a cover system that does not interfere with opening of the hood or the doors or any other normal function of the vehicle. Other objects will become apparent from the more detailed description of this invention which follows.

BRIEF DESCRIPTION OF THE INVENTION

This invention relates to a protective cover for an automotive vehicle comprising a hood cover, a pair of front body covers, a pair of rear body covers, and means for removeably attaching each said cover to the outside of the body of said vehicle; said hood cover being substantially identical in size and shape to the outside surface of said hood and being secured to said hood by a plurality of spaced magnet members and a plurality of spaced manually bendable tabular clasp members attached to said hood cover around the perimeter thereof; said front body cover being substantially identical in size and shape to the outside surface of the front body of the vehicle from the fender and grille to slightly beyond the rear edge of the front door and being secured to said body by a plurality of spaced magnet members and a plurality of spaced manually bendable tabular clasp members around the perimeter thereof and adjacent the front wheel well; and said rear body cover being substantially identical in size and shape to the outside surface of the rear body of the vehicle from the rear edge of the front door to the rear end of the body and secured to the body by a plurality of spaced magnet members and a plurality of spaced manually bendable tabular clasp members around the perimeter thereof and adjacent the rear wheel well.

In preferred embodiments of this invention the magnet members are Grade 5 ceramic magnet material in an open sided steel channel member and the material of the cover is either nylon fabric laminated between two sheets of polyvinylchloride or a woven sheet of nylon yarn of about 1000 denier in size, the cover being 20 to 40 mils in thickness.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a side elevation view of a portion of the present invention shown installed on a motor vehicle.

FIG. 2 is a side elevation of another portion of the present invention shown on another portion of the motor vehicle.

FIG. 3 is a cross-sectional view taken at 3—3 of FIG. 2.

FIG. 4 is a cross-sectional view taken at 4—4 of FIG. 2.

DETAILED DESCRIPTION OF THE INVENTION

The present invention relates to a durable, tough sheet of plastic and/or fabric protective cover, members of which are adapted to be fastened over related portions of the body of a motor vehicle. A pair of front fender and door cover members may be removeably affixed to the front fenders and front door panels of the vehicle. A pair of rear body portion cover members may be removeably affixed to the remaining rear side panels of the vehicle. A hood cover member may be removeably affixed to the hood portion of the vehicle. As an optional additive, a tailgate cover member may be removeably affixed to the tailgate portion of the vehicle.

The front fender and door cover member extends from the front edge of the front fender of the vehicle to slightly beyond the rear edge of the door, to overlap the rear body portion cover member. The front fender and door covers extend upwards to the hood and to the door window of the vehicle leaving only enough clearance so as not to interfere with the opening and closing of the hood, door, and window. The front fender and door cover member is cut to fit securely around the wheel well and also includes appropriate cut-outs for door handles and side view mirror assemblies.

The rear body portion cover member extends from the rear edge of the door opening to the extreme rear of the vehicle. It is cut to fit securely from the top of the rear body panel of the vehicle down to the bottom of the body panel of the vehicle with a cut-out portion for the rear wheel well.

A hood cover member covers the entire hood from the front lip of the vehicle to the forward edge of the windshield. This cover is of a size and shape to permit the hood to be opened and closed with the hood cover member still in place. Appropriate cut-outs are provided for hood ornaments as required. The hood with hood cover member attached is readily openable without interference from any components of this invention.

The tailgate cover member is optional. It extends over the entire rear outside surface of the tailgate so that the tailgate may be opened and closed with the tailgate cover member in place. In a special embodiment of this invention the entire outside surface both forward and rear, are covered by the tailgate cover member.

Each cover member is removeably attachable to the corresponding body portion of the vehicle by means of a plurality of magnet members spaced around the perimeter of the cover member and affixed to the cover member. In addition the cover member is secured to the body of the vehicle in selected areas, such as wheel well cut-outs, door battens, truck bed bottoms, etc. by a plurality of manually bendable tabular clasps spaced along the perimeter of those areas. The magnet members and the clasps are made in such a manner and affixed to the cover member in such a manner as to provide no damage to the finish of the vehicle when in use.

The details of this invention may best be seen by reference to the attached drawings. Motor vehicle 10 is shown with a front fender portion 12, door 14, rear body portion 60, and hood 46. Hood 46 is covered entirely by hood cover member 44 which is exactly the size of hood 46 and is fastened thereto by a plurality of magnet members 24 and/or a plurality of manually bendable tabular clasp members 34 affixed to cover member 44 spacedly around its perimeter, e.g., in a hem in the perimeter. Hood 46 is openable and closeable with cover member 44 attached.

Front fender and door cover member 16 extends continuously from its front edge 26 adjacent grille 20 to its rear edge 30 slightly beyond the rear edge 31 of door 14, and from its top edge 28 adjacent hood 46 to its bottom edge 32 adjacent the bottom edge of fender 12 and the bottom of door 14. This cover member 16 will cover all outside finished areas of the body of vehicle 10 from the hood 46 and grille 20 to the rear body portion 60 of vehicle 10. A similar cover member 16 is on the opposite side of vehicle 10 from that shown in FIG. 1.

Spaced along the perimeter of front fender and body cover 16 are magnets 24 and/or manually bendable tabular clasp members 34 affixed to cover 16. Preferably, magnets 24 are affixed to cover member 16 by being encased in a perimeter hem 25 so as to prevent any scratching or marring of the finish of vehicle 10 by having direct contact between the metallic magnet and the finish. Spacing between magnets will depend on the strength of the magnet. Around the perimeter of cut-out portion of cover member 16 at the edge 36 of the front wheel well, and around other suitable areas such as the door battens, truck bed bottoms, etc., there are manually bendable tabular clasps 34 affixed to cover member 16 and bent around the edge 36 (as shown best in FIG. 4 for the rear wheel well). Clasps 34 may also be employed whereever there is a portion of the vehicle to which the tabular clasp can be attached, e.g., door bottoms, truck bed bottoms, etc.

A preferred additional item for securing the two front fender and door covers 16 in place is an elastic cord 18 stretched across grille 20 and attached to the front edge 26 of each cover 16. A suitable method of attachment is for grommets 22 to be placed in cover 16 and for elastic cord 18 to have a hook at each end thereof to be attachable to grommets 22. It is, of course, within the scope of this invention to employ one, two, or more elastic cords 18 and the corresponding number of grommets 22.

The rear portion 60 of the body of vehicle 10 is likewise protected by a continuous cover sheet 62 extending from front edge 64 to rear edge 72 and from top edge 66 to bottom edges 68 and 70 forward of and rearward of, respectively, rear wheel 86. Around wheel 86 the bottom edge of cover 62 follows the edge of wheel well 74. It will be seen that rear edge 30 of front cover 16 overlaps and lies over the outside of rear cover 62 by a small amount, e.g. 2-4 inches so as to provide no possibility for trees, branches, shrubs, etc., to catch the front edge 64 of rear cover 62 and cause it to be torn off.

Rear cover 62 is attached to the body of vehicle 10 by a plurality of spaced magnets 24 or tabular clasps 34 around edges 64, 66, 68, 70 and 72. Manually bendable tabular clasps 34 are employed to attach cover 62 to the edge of wheel well 74. These attaching means are identical in type, spacing and manner of fixation to cover 62 as described above with respect to front cover 16. FIG. 3 shows in cross-section how cover 62 has magnets 24 along top edge 66 and bottom edge 68 on the outside surface of panel 60, with floor 84 of vehicle 10 on the inside of panel 60.

An optional, although preferred, additional item is a cover for tailgate 78 of vehicle 10. Tailgate cover 76 can be made merely to cover the outside rear surface 85 of tailgate 78 and therefore consist of a single rectangular sheet attached to surface 85 by a plurality of spaced magnets 24 or tabular clasps 34 around the perimeter of cover 76 as described with respect to cover 16. A preferred construction for tailgate cover 76, however, is to make cover in the form of a glove to cover all exposed surfaces except for any eyes or chains used to support tailgate 78 in an open position. When cover 76 is formed as a slip-on glove, the top edge 82 of tailgate is inside of cover 76 which has an opening along bottom edge 80 of tailgate 78. A plurality of spaced magnets 34 need only be placed along the opening of cover 76 to be attached to tailgate 78 along its bottom edge 80.

In FIG. 4 there is shown in detail how clasp 34 is bent inwardly around the lip of wheel well 74 so as to hold cover 62 tightly against panel 60 in concert with magnets 24 along top edge 66 of cover 62.

The materials employed for covers 16, 62, and 76 may be any tough, nonabrasive, tear-resistant material in a flexible sheet form. Preferably the sheet is capable of being fabricated into suitable covers by stitching, heat-sealing, or the like so as to form hems in the covers to encase magnets 24 or otherwise affix the magnets thereto. A suitable material is a plastic sheet 20-40 mils (0.020-0.040 inch) in thickness, the chemical nature of the material being, polyvinyl, polyamide, polyolefin, polyester, or the like. Polyvinylchloride is the preferred material because of its physical properties, ready availability, and relative low cost. It is most preferable to employ a reinforced polyvinylchloride, comprising a central layer of fabric (nylon preferred) laminated between two outer layers of polyvinylchloride. Another preferred material for covers 16, 62 and 76 is a woven fabric of heavy yarns, e.g., at least 1,000 denier of nylon or other type yarn. Such material is considerably lighter in weight than the laminated polyvinylchloride, and provides adequate protection for vehicles in relatively light underbrush. For the best protection in heavy underbrush including some trees, the laminated cover material is preferred.

The preferred magnets for use in this invention are Grade 5 ceramic magnet material in an open sided steel channel, and the spacing used may be about 12-24 inches apart. A particularly preferred magnet is No. CH-35 made by Jobmaster Corporation of Randallstown, Md. having 65 lbs. pull and measuring $1.5 \times 3$ inches $\times 0.460$ inch thick.

Clasps 34 are preferably made of a central strip of manually bendable aluminum, or similar metal that will remain bent with no elastic memory, covered by plastic or fabric so as to prevent any contact between the metal of the clasp 34 and the finish on vehicle 10. A preferred clasp 34 has a central strip of aluminum approximately $\frac{1}{4} \times 2$ inches $\times 0.0625$ inch thick covered by polyvinylchloride approximately 30 mils thick. The clasp may be affixed to the cover member in any convenient manner, e.g., heat sealing the plastic covering of the clasp to the plastic of the cover, riveting, etc.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to be secured by Letters Patent of the United States is:

1. A protective cover for an automotive vehicle comprising a hood cover, a pair of front body covers, a pair of rear body covers, and means for removeably attaching each said cover to the outside of the body of said vehicle; said hood cover being substantially identical in size and shape to the outside surface of said hood and being secured to said hood by a plurality of spaced magnet members and a plurality of spaced manually bendable tabular clasp members attached to said hood covers around the perimeter thereof and leaving the hood to be openable with said pair of front body covers attached; said front body covers being substantially identical in size and shape to the outside surface of the front body of the vehicle from the fender and grille to slightly beyond the rear edge of the front doors and being secured to said body by a plurality of spaced magnet members and a plurality of space manually bendable tabular clasp members around the perimeter thereof and by a plurality of spaced manually bendable tabular clasp members around the perimeter of the front wheel wells the front doors being openable with said cover attached and slightly overlapping the front edges of said rear body covers, the front edges of the front body covers being joined to each other by a detachable elastic cord stretched across the grille; and said rear body cover being substantially identical in size and shape to the outside surface of the rear body of the vehicle from the rear edge of the front door to the rear end of the body and secured to the body by a plurality of spaced magnet members and a plurality of spaced manually bendable tabular clasp members around the perimeter thereof and by a plurality of spaced manually bendable tabular clasp members around the rear wheel wells.

2. The cover of claim 1 wherein each said hood cover and each said body cover is hemmed around the perimeter thereof and contains said magnet members inside said hemmed portion.

3. The cover of claim 1 wherein each said magnet member is a Grade 5 ceramic magnet mass in an open-sided steel channel.

4. The cover of claim 1 wherein each said hood cover and each said body cover is made of a fabric reinforced polyvinylchloride sheeting of about 0.020 to 0.040 inch in thickness.

5. The cover of claim 1 wherein each said hood cover and each said body cover is a woven fabric of nylon yarn of about 1,000 denier.

6. The cover of claim 1 wherein each said manually bendable tabular clasp comprises a central strip of aluminum encased in a polyvinylchloride tube attached to the perimeter of a body cover.

7. A protective cover for the body portions of a pickup truck comprising a hood cover member, two front fender and door cover members, two side panel cover members to the outside surfaces of the respective body portions of said truck; said hood cover member being substantially coextensive with the hood portion of said truck and being releaseably attachable to said hood portion by a plurality of magnet members and a plurality of manually bendable tabular clasp members affixed spacedly around the perimeter of said hood cover member, said hood with said hood cover attached being openable without unfastening any other of said cover members or attachments thereto; each said front fender and door panel from the grille to slightly beyond the rear edge of the door and from adjacent said hood cover member to the front wheel well and the bottom edges of the adjacent fender areas and bottom of the door, said front fender and door cover member being releaseably attachable to the corresponding portion of the truck body by a plurality of magnet members and a plurality of manually bendable tabular clasps affixed spacedly around the perimeter of said cover member and around the perimeter of the wheel well portion of said cover member, the front edges of the two front fender and door cover members being joined by a detachable elastic cord stretched across the grille, the front doors of said truck being openable without unfastening any of said cover member or attachments thereto; and each said side panel cover member being substantially coextensive with the side of said truck rearward from the door to the tailgate and from the top of the panel to the bottom of the body adjacent the rear wheel well, said panel cover members being releaseably attachable to the corresponding body portion of said truck by a plurality of magnet members and a plurality of manually bendable tabular clasps affixed spacedly around the perimeter of said cover member and around the perimeter of the wheel well portion of said cover member, the cover members for the doors slightly overlapping the outside of the forward edges of the side panel cover members.

8. The cover of claim 7 which additionally comprises a tailgate cover member coextensive with the rear surface of the tailgate of said truck and releaseably attached thereto by a plurality of magnet members and a plurality of manually bendable tabular clasp members affixed spacedly around the perimeter of said cover member.

9. The cover of claim 7 wherein each said magnet member is a Grade 5 ceramic magnet material in an open-sided steel channel.

10. The cover of claim 7 wherein each said cover member is made of a central layer of fabric laminated between two outside layers of polyvinylchloride, said cover member being about 20-40 mils in thickness.

11. The cover of claim 7 wherein each said cover member is a woven material of nylon yarn of about 1,000 denier.

12. The cover of claim 7 wherein each said manually bendable tabular clasp comprises a central strip of aluminum encased in a tube of polyvinylchloride.

* * * * *